United States Patent
Vemula et al.

(10) Patent No.: US 8,549,251 B1
(45) Date of Patent: Oct. 1, 2013

(54) METHODS AND APPARATUS FOR EFFICIENT MODIFICATION OF VALUES WITHIN COMPUTING REGISTERS

(75) Inventors: Murali Vemula, Fremont, CA (US); Sathish Shenoy, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 12/968,884

(22) Filed: Dec. 15, 2010

(51) Int. Cl.
*G06F 13/00* (2006.01)
*G06F 13/28* (2006.01)

(52) U.S. Cl.
USPC ........... 711/173; 711/155; 711/159; 712/224; 712/225

(58) Field of Classification Search
USPC .............................................. 326/37–41, 47
See application file for complete search history.

(56) References Cited

U.S. PATENT DOCUMENTS

| | | |
|---|---|---|
| 5,996,032 A | 11/1999 | Baker |
| 6,363,442 B1 | 3/2002 | Chapman |
| 6,532,533 B1 * | 3/2003 | Bhandal et al. ............... 712/225 |
| 7,228,378 B1 * | 6/2007 | Pereira .......................... 711/108 |
| 2009/0172364 A1 * | 7/2009 | Sprangle et al. ............. 712/225 |
| 2009/0240986 A1 * | 9/2009 | Warren et al. .................. 714/32 |
| 2010/0061394 A1 | 3/2010 | Sindhu |
| 2010/0165983 A1 | 7/2010 | Aybay |
| 2011/0106981 A1 * | 5/2011 | Watkins et al. .................... 710/9 |
| 2011/0185150 A1 * | 7/2011 | Spracklen ....................... 712/22 |
| 2011/0231587 A1 * | 9/2011 | Andersson et al. ........... 710/107 |

* cited by examiner

*Primary Examiner* — Jany Richardson
(74) *Attorney, Agent, or Firm* — Cooley LLP

(57) ABSTRACT

In some embodiments, an apparatus includes a register having a first portion and a second portion. The first portion of the register has multiple bits and the second portion of the register has multiple bits. Each bit from the multiple bits of the first portion of the register is associated with a bit from the multiple bits of the second portion of the register such that a bit from the multiple bits of the first portion of the register is set for its associated bit from the multiple bits of the second portion of the register to be written.

20 Claims, 5 Drawing Sheets

200

| M₄ | M₃ | M₂ | M₁ | X₄ | X₃ | X₂ | X₁ |
|---|---|---|---|---|---|---|---|
| 0 | 0 | 0 | 0 | 0 | 1 | 1 | 0 |

| M₄ | M₃ | M₂ | M₁ | X₄ | X₃ | X₂ | X₁ |
|---|---|---|---|---|---|---|---|
| 0 | 0 | 1 | 1 | 0 | 1 | 1 | 0 |

| $M_4$ | $M_3$ | $M_2$ | $M_1$ | $X_4$ | $X_3$ | $X_2$ | $X_1$ |
|---|---|---|---|---|---|---|---|
| 0 | 0 | 1 | 1 | 0 | 1 | 1 | 1 |

Write, to a first portion of a register, a first value that indicates a first set of bits from multiple bits of a second portion of the register with which a first function is associated.
402

Write, to the second portion of the register, a second value having multiple bits, each of which is uniquely associated with one bit from the multiple bits of the second portion of the register.
404

Write, to the first portion of the register, a third value that indicates a second set of bits from multiple bits of the second portion of the register with which a second function is associated.
406

Write, to the second portion of the register, a fourth value having multiple bits, each of which is uniquely associated with one bit from the multiple bits of the second portion of the register.
408

FIG. 7

METHODS AND APPARATUS FOR EFFICIENT MODIFICATION OF VALUES WITHIN COMPUTING REGISTERS

BACKGROUND

Some embodiments described herein relate generally to computing registers, and, in particular, to methods and apparatus to efficiently update the values of computing registers.

In some known compute devices and/or systems, modules, processes, and/or functions write data to a register using a "read-modify-write" set of instructions. In such compute systems, the module, process, and/or function writing data to the register typically locks the register during the "read-modify-write" process. Such a locking mechanism prevents other modules, processes, and/or functions from accessing (e.g., reading data from and/or writing data to) that register until the module, process, and/or function writing data to the register finishes writing the data to that register. The "read-modify-write" process and the locking process can delay the operations of other modules, processes and/or functions.

Accordingly, a need exists for a register that can quickly be accessed by multiple modules, processes, and/or functions.

SUMMARY

In some embodiments, an apparatus includes a register having a first portion and a second portion. The first portion of the register has multiple bits and the second portion of the register has multiple bits. Each bit from the multiple bits of the first portion of the register is associated with a bit from the multiple bits of the second portion of the register such that a bit from the multiple bits of the first portion of the register is set for its associated bit from the multiple bits of the second portion of the register to be written.

BRIEF DESCRIPTION OF THE DRAWINGS

FIGS. 3-5 are schematic illustrations of a register in different configurations, according to an embodiment.

FIG. 7 is a flow chart illustrating a method of writing a value to a register, according to another embodiment.

DETAILED DESCRIPTION

Figure 1:
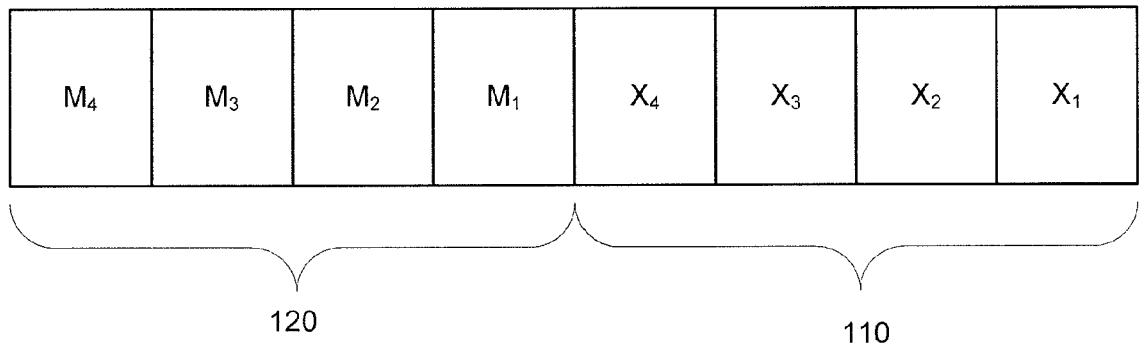
FIG. 1 is a schematic illustration of a register, according to an embodiment.

In some embodiments, an apparatus includes a register having a first portion and a second portion. The first portion of the register has multiple bits and the second portion of the register has multiple bits. Each bit from the multiple bits of the first portion of the register is associated with a bit from the multiple bits of the second portion of the register such that a bit from the multiple bits of the first portion of the register is set for its associated bit from the multiple bits of the second portion of the register to be written.

In such embodiments, the multiple bits of the first portion of the register are mask bits for the data bits of the second portion of the register. Accordingly, the value of the mask bits of the first portion of the register are read to determine whether to update data at the second portion of the register based on a "write" command. If a mask bit associated with a data bit is set (e.g., has a value of "1"), the associated data bit is updated with a value provided by a module, process, and/or function. Alternatively, if the mask bit associated with the data bit is not set (e.g., has a value of "0"), the associated data bit is not updated with the value provided by the module, process, and/or function and the value of the data bit remains unchanged.

In some embodiments, a non-transitory processor-readable medium stores code representing instructions to cause a processor to write a first value to a first portion of a register. The first value indicates a first set of bits from multiple bits of a second portion of the register with which a function is associated. The non-transitory processor-readable medium further stores code that represents instructions to cause the processor to write a second value having multiple bits to the second portion of the register. Each bit from the multiple bits of the second value is uniquely-associated with one bit from the multiple bits of the second portion of the register. A bit value of each bit from the first set of bits from the multiple bits of the second portion of the register is made equal to a bit value of its associated bit from the multiple bits of the second value in response to writing the second value. A bit value of each bit from the second set of bits not changing in response to writing the second value.

In some embodiments, an apparatus includes a register and a processor. The register has a first portion and a second portion mutually exclusive of the first portion. The first portion of the register includes multiple bits and the second portion of the register includes multiple bits. Each bit from the multiple bits for the second portion of the register is uniquely-associated with one bit from the multiple bits for the first portion of the register. The processor is configured to execute a module that writes a first set of bits to the first portion of the register such that each bit from the multiple bits for the first portion of the register equals a value of an associated bit from the first set of bits. The processor is configured to execute the module such that a value of each bit from the multiple bits for the second portion of the register is made equal to a value of an associated bit of a second set of bits when (1) the uniquely-associated bit from the multiple bits for the first portion of the register has a first value, and (2) the module writes the second set of bits to the second portion of the register. The processor is configured to execute the module such that a value of each bit from the multiple bits for the second portion of the register is not changed when (1) the uniquely-associated bit from the multiple bits for the first portion of the register has a second value, and (2) the module writes the second set of bits to the second portion of the register.

As used herein, "to lock" a register and/or "locking" a register means preventing modules, functions and/or processes from modifying a value in that register. For example, prior to a first module performing a read-modify-write set of instructions to write a value to the register, the first module locks the register. This ensures that a second module will not write to the register prior to the first module completing the read-modify-write set of instructions. For another example, in some embodiments, if a module uses multiple clock cycles (e.g., multiple instructions executed one per clock cycle) to write to a register, the module can lock the register for those clock cycles. Additionally, if a module and/or processing device executes a single instruction per clock cycle, the module and/or processing device does not lock the register if a write is performed in a single instruction.

As used in this specification, the singular forms "a," "an" and "the" include plural referents unless the context clearly dictates otherwise. Thus, for example, the term "module" is intended to mean a single module or a combination modules.

FIG. 1 is a schematic illustration of a register 100, according to an embodiment. The register 100 can be any hardware register used to store bits of information at a computing device and/or system. For example, the register 100 can be a general purpose register, an accumulator, a processor register for use with a central processing unit (CPU), a configuration register, a start-up register, a strobe register, a register that is part of registered memory, a programmer-visible register, an interrupt status register, an interrupt mask register, a direct memory access (DMA) engine register, an indexing register, and/or the like. Additionally, while the register 100 is shown and described herein as being an 8-bit register, in other embodiments, the register can include any number of bits. In some embodiments, for example, the register can include 4 bits, 16 bits, 32 bits, 64-bits, 128 bits and/or any other number of bits.

The register 100 includes a first portion 110 and a second portion 120. The first portion 110 of the register 100 includes four bits $X_1$-$X_4$ and is used to store data. In other embodiments, the first portion of the register 110 can include a different number of bits (e.g., 8, 16, 32, 64, 128, etc.). One or more processes, modules, functions and/or the like can retrieve data from and/or store data at the first portion 110 of the register 100. For example and as described in further detail herein, a module can store and/or cache data in the first portion 110 of the register 100 when executing and/or performing processes and/or functions. For another example, an arithmetic logic unit (ALU) of a processor can store one or more intermediate values in the register 100 when the ALU performs multi-step computations. As such, the first portion 110 of the register 100 can function similar to any suitable hardware register.

In some embodiments, a first set of bits (e.g., $X_1$ and $X_2$) can be associated with a first module, process and/or function and a second set of bits (e.g., $X_3$ and $X_4$) can be associated with a second module, process and/or function. In such embodiments, a first module can be configured to store data in the first set of bits ($X_1$ and $X_2$) and a second module can be configured to store data in the second set of bits ($X_3$ and $X_4$). Alternatively, a first process and/or function can be configured to store data in the first set of bits ($X_1$ and $X_2$) and a second process and/or function can be configured to store data in the second set of bits ($X_2$ and $X_3$). For example, a hash function can be configured to access the first set of bits ($X_1$ and $X_2$) and an interrupt function can be configured to access the second set of bits ($X_3$ and $X_4$).

The second portion 120 of the register 100 includes a number of bits $M_1$-$M_4$ equal to the number of bits $X_1$-$X_4$ of the first portion 110 of the register 100. Accordingly, as shown in FIG. 1, because the first portion 110 of the register 100 includes four bits, the second portion 120 of the register 100 also includes four bits $M_1$-$M_4$. Additionally, each bit $M_1$-$M_4$ of the second portion 120 of the register 100 can be uniquely-associated with a bit $X_1$-$X_4$ of the first portion 110 of the register 100. For example, bit $M_1$ can be associated with bit $X_1$, bit $M_2$ can be associated with bit $X_2$, bit $M_3$ can be associated with bit $X_3$, and bit $M_4$ can be associated with bit $X_4$.

The second portion 120 of the register 100 can function as a mask and/or key for the first portion 110 of the register 100. More specifically, each bit $M_1$-$M_4$ of the second portion 120 of the register 100 can function as a mask and/or key for its associated bit $X_1$-$X_4$ of the first portion 120 of the register 100. As such, if the bit $M_1$ is set (e.g., has a value of 1), a value (i.e., a 1 or a 0) can be written to the bit $X_1$. Similarly, if the bit $M_2$, the bit $M_3$, or the bit $M_4$ is set, a value can be written to the bit $X_2$, the bit $X_3$, or the bit $X_4$, respectively. Accordingly, as described in further detail herein, a module writes to the first portion 110 of the register 100 after writing a mask value to the second portion 120 of the register 100. In some embodiments and as described in further detail herein, such a write instruction can be a single write instruction executed by a processing device with the bits $M_1$-$M_4$ of the second portion 120 of the register 100 being written prior to the bits $X_1$-$X_4$ of the first portion 110 of the register 100. This reduces the number of instructions used to write to the register and provides a module, process and/or function with the ability to write to the register 100 (or effectively to a portion of the register 100) without locking the entirety of register 100.

Figure 2:
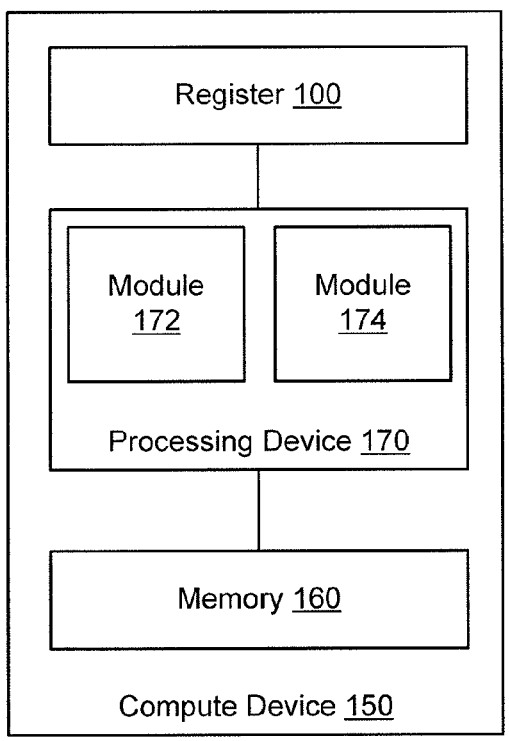
FIG. 2 is a schematic illustration of a compute device with the register of FIG. 1, according to an embodiment.

FIG. 2 is a schematic illustration of a compute device 150 using the register 100. The compute device 150 also includes a processing device 170 and a memory 160. The compute device 150 can be used in any system and/or apparatus that uses a processing device. For example and as described in further detail herein, such a compute device 150 can be used in a networking environment such as in a switch fabric system.

The processing device 170 can be any suitable processing device, such as, for example, a general-purpose processor, a Field Programmable Gate Array (FPGA), a Digital Signal Processor (DSP), an Application Specific Integrated Circuit (ASIC), a microcontroller, and/or the like. The processing device 170 can be configured to execute processes, functions and/or modules. For example, as shown in FIG. 2, the processing device 170 is configured to execute module 172 and module 174. The modules 172 and 174 can be implemented in hardware and/or software (executing at the processing device 170). The modules 172 and 174 can be configured to cause the processing device 170 to perform certain function(s) and/or process(es). For example, the module 172 and/or the module 174 can be configured to perform hash functions, Media Access Control (MAC) learning functions, DMA functions, interrupt functions, routing functions, and/or any other type of function and/or process.

In some embodiments, the module 172 and the module 174 are configured to access the register 100. In some embodiments, for example, the module 172 is configured to access (read and/or write) the bits $X_1$ and $X_2$ of the first portion 110 of the register 100 and the module 174 is configured to access (read and/or write) the bits $X_3$ and $X_4$. For example, the module 172 (or a function and/or process associated with the module 172) can store and/or retrieve data in the bits $X_1$ and $X_2$. Accordingly, the bits $X_1$ and $X_2$ can provide storage for the module 172 (e.g., intermediate storage for functions and/or processes performed by the module 172). Similarly, the module 174 (or a function and/or process associated with the module 172) can store data in the bits $X_3$ and $X_4$.

The memory 160 can be, for example, a random access memory (RAM), a read only memory (ROM), a memory buffer, a hard drive, an erasable programmable read-only memory (EPROM), an electrically erasable programmable read-only memory (EEPROM) and/or so forth. In some embodiments, the memory 160 stores code representing instructions configured to cause the processing device 170 to perform functions and/or execute modules. In some embodiments, for example, the memory 160 can store code representing instructions configured to cause the processing device 170 to execute the module 172 and/or the module 174. In other embodiments, the memory can store any other type of instructions and/or data.

In use, the module 172 and/or the module 174 can write to specific bits $X_1$-$X_4$ of the first portion 110 of the register 100 by writing a key and/or mask to the bits $M_1$-$M_4$ of the second portion 120 of the register 100. For example, if the module 172 is associated with the bits $X_1$ and $X_2$ but not the bits $X_3$ and $X_4$, the module 172 can write a value of "0011" to the bits $M_4M_3M_2M_1$ of the second portion 120 of the register 100. Because the bits $M_1$ and $M_2$ are set (e.g., have a value of 1), whatever the module 172 provides (e.g., using a write instruction) to the bits $X_1$ and $X_2$ (associated with the bits $M_1$ and $M_2$) will be stored in the first portion 110 of the register 100. Similarly, because the bits $M_3$ and $M_4$ are not set (e.g., have a value of 0), whatever the module 172 provides (e.g., using a write instruction) to the bits $X_3$ and $X_4$ (associated with the bits $M_3$ and $M_4$) will not be stored in the first portion 110 of the register.

For example, if the value of the first portion 110 of the register is currently "1010" (i.e., $X_4=1$, $X_3=0$, $X_2=1$, $X_1=0$) and the module 172 is running a process that requests to store a value of "01" (i.e., $X_2=0$ and $X_1=1$) in the bits $X_2$ and $X_1$ of the first portion 110 of the register 100 without changing the values of the bits $X_3$ and $X_4$ of the first portion 110 of the register, the module 172 can provide (e.g., using a write instruction) a value of "0011" (i.e., $M_4=0$, $M_3=0$, $M_2=1$, $M_1=1$) to the second portion 120 of the register 100 and a value of "XX01" (with X being either a "0" or a "1") to the first portion 110 of the register 100. Because the bits $M_1$ and $M_2$ are set (e.g., have a value of "1"), the value provided by the module 172 of their associated bits $X_1$ and $X_2$ (i.e., $X_2=0$ and $X_1=1$) will be written to the bits $X_1$ and $X_2$. Similarly, because the bits $M_3$ and $M_4$ are not set (e.g., have a value of "0"), the value provided by the module 172 of their associated bits $X_3$ and $X_4$ will not written to the bits $X_3$ and $X_4$. Accordingly, after the write function is executed, the first portion of the register equals "1001" (i.e., $X_4=1$, $X_3=0$, $X_2=0$, $X_1=1$). Thus, the bits $X_2$ and $X_1$ were written while the bits $X_4$ and $X_3$ were not written.

In some embodiments, the module 172 provides a value for both the first portion 110 of the register 100 and the second portion 120 of the register 100 in a single "write" instruction executed by the module 172. In the above example, for example, the module 172 can instruct the processing device 170 to write a value of "0011XX01" (i.e., $M_4M_3M_2M_1X_4X_3X_2X_1$) to the register 100 in a single "write" instruction. The processing device 170 (e.g., hardware logic of the processing device 170) can write the bits $M_1$-$M_4$ of the second portion 120 of the register 100 prior to writing the bits $X_1$-$X_4$ of the first portion 110 of the register 100. More specifically, the processing device 170 can write the bits of the register 100 starting at the highest order bit $M_4$ and ending with the lowest order bit $X_1$. In such embodiments, bit $M_4$ is written first, $M_3$ second, $M_2$ third, and $M_1$ fourth. Accordingly, the value written to the bits $M_1$-$M_4$ of the second portion 120 of the register 100 is stored in the second portion 120 of the register 100 prior to the value written to the bits $X_1$-$X_4$ of the first portion 110 of the register 100.

Continuing with the above example, the processing device 170 can determine whether to write the bit $X_4$ fifth, the bit $X_3$ sixth, the bit $X_2$ seventh, and the bit $X_1$ last. When determining whether to write the bits $X_1$-$X_4$ of the first portion of the register 100, the processing device 170 can read the bits $M_1$-$M_4$ of the second portion 120 of the register 100. More specifically, when determining whether to write the bit $X_4$, the processing device 170 reads the bit $M_4$. If the bit $M_4$ is set, the bit $X_4$ is written. Similarly, when determining whether to write the bits $X_3$, $X_2$, and $X_1$, the processing device 170 reads the bits $M_3$, $M_2$, and $M_1$, respectively.

By providing the value to the register 100 using a single "write" instruction, the module 172 does not need to lock the register 100 prior to writing the register 100. For example, after the module 172 instructs the processing device 170 to write the value to the register 100, the module 174 can instruct the processing device 170 to write a different value to the register 100. The processing device 170, however, will execute the instruction received from the module 174 after the processing device 170 has finished executing the instruction received from the module 172. This provides greater access to the register 100 for each module 172 and module 174. More specifically, each module 172 and 174 can read and write to the register at any time. This additionally reduces the number of instructions used to write to the register 100.

In some embodiments and as described above, the module 172 is associated with a different set of bits $X_1$-$X_4$ of the first portion 110 of the register 100 than the module 174. For example, the module 172 can be associated with the bits $X_1$ and $X_2$ and the module 174 can be associated with the bits $X_3$ and $X_4$. In such embodiments, the module 172 can be assigned a mask and/or key of "0011" ($M_4M_3M_2M_1$) and the module 174 can be assigned a mask and/or key of "1100" ($M_4M_3M_2M_1$). Accordingly, whenever the module 172 writes to the register 100, the mask bits are "0011". Similarly, whenever the module 174 writes to the register 100, the mask bits are "1100". This prevents the module 172 from overwriting the data used by the module 174 and vice versa.

Figures 3, 4:
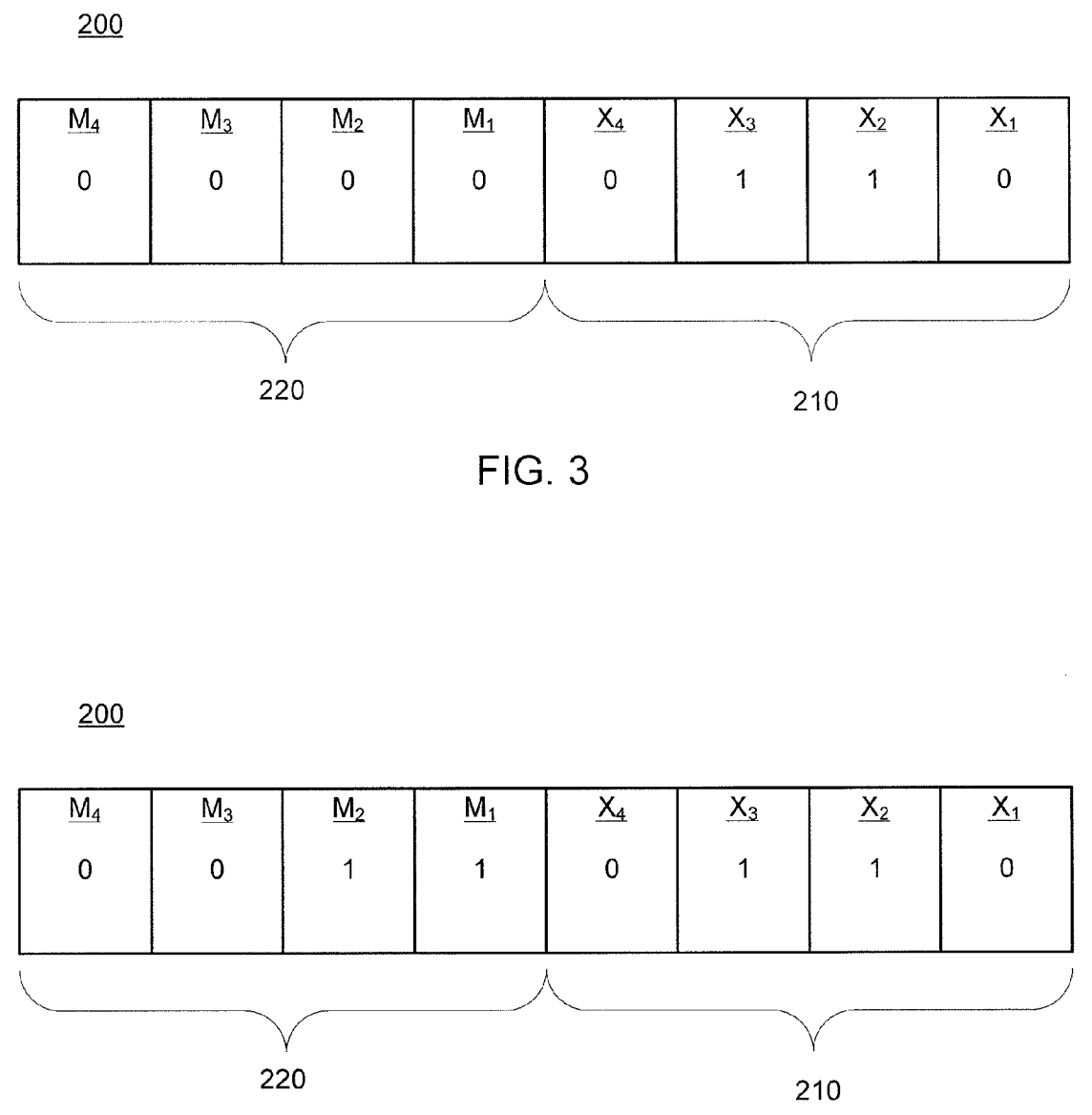
Figure 5:
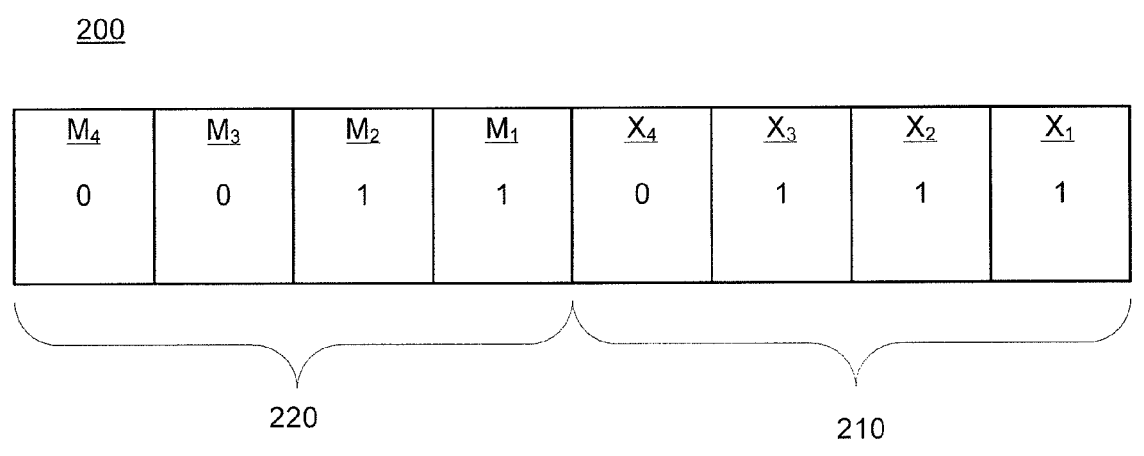

FIGS. 3-5 illustrate an example of writing a value to a register 200. The register 200 shown and described with respect to FIGS. 3-5 can be structurally and functionally similar to the register 100 shown and described above with respect to FIGS. 1 and 2. Accordingly, the register 200 includes a first portion 210 having a number of bits $X_1$-$X_4$ and a second portion 220 having a number of bits $M_1$-$M_4$. The first portion 210 is configured to store data associated with modules, functions and/or processes and the second portion 220 is configured to be a mask and/or key for the first portion 210. Similar to the register 100, each bit $M_1$-$M_4$ of the second portion 220 acts as a mask and/or key for a bit $X_1$-$X_4$ of the first portion 210. Thus, the bit $M_4$ acts as a mask and/or key for the bit $X_4$, the bit $M_3$ acts as a mask and/or key for the bit $X_3$, the bit $M_2$ acts as a mask and/or key for the bit $X_2$, and the bit $M_1$ acts as a mask and/or key for the bit $X_1$.

FIG. 3 illustrates the register 200 prior to a write instruction being executed by a processing device (e.g., similar to processing device 170 shown and described with respect to FIG. 2). As shown in FIG. 3, the first portion 210 of the register 200 has a value of "0110" ($X_4X_3X_2X_1$) and the second portion 220 of the register 200 has a value of "0000" ($M_4M_3M_2M_1$). The processing device can execute an instruction to write a value of "11" to the bits $X_2$ and $X_1$ (i.e., $X_2=1$ and $X_1=1$). Thus, to write the value of "11" to the bits $X_2$ and $X_1$, the processing device executes an instruction to write the value of "0011XX11" ($M_4M_3M_2M_1X_4X_3X_2X_1$) to the register 200. More specifically, the processing device executes an instruction to write the value "0011" ($M_4M_3M_2M_1$) to the second portion 220 of the register 200 and the value "XX11" ($X_4X_3X_2X_1$) to the first portion 210 of the register 200.

In executing the write instruction, the processing device writes each bit $M_4$-$M_1$ and $X_4$-$X_1$ individually from the highest-order bit $M_4$ of the register 200 to the lowest-order bit $X_1$ of the register 200. Accordingly, the second portion 220 of the register 200 is written prior to the first portion 210 of the register 200. FIG. 4 illustrates the register 200 after the processing device has written the second portion 220 but prior to the processing device writing the first portion 210. Accordingly, as shown in FIG. 4, the value of the second portion 220 has been updated to equal "0011" ($M_4M_3M_2M_1$).

The processing device can use the values of the bits $M_1$-$M_4$ in the second portion 220 when determining which bits of the first portion 210 to update. More specifically, when determining whether or not to write to the bit $X_4$, the processing device reads the value of the bit $M_4$ (i.e., its associated mask and/or key). Because the value of the bit $M_4$ is "0", the processing device does not write to the bit $X_4$. Accordingly, the value of the bit $X_4$ remains unchanged from the value of the bit $M_4$ prior to the processing device executing the write instruction. Similarly, when determining whether or not to write to the bit $X_3$, $X_2$ or $X_1$, the processing device reads the value of the bit $M_3$, $M_2$ or $M_1$, respectively. Accordingly, the processing device does not write to the bit $X_3$ ($M_3$=0) but does write to the bit $X_2$ ($M_2$=1) and the bit $X_1$ ($M_1$=1).

FIG. 5 illustrates the register 200 after the processing device has executed the write instruction. The second portion 220 of the register 200 has a value of "0011" ($M_4M_3M_2M_1$) (i.e., the value written to the second portion 220 of the register 200 by the processing device). The first portion 210 of the register 200 has a value of "0111" ($X_4X_3X_2X_1$). The values of the bits $X_4$ and $X_3$ remain the same as their values prior to the processing device executing the write instruction because the processing device did not write to the bits $X_4$ and $X_3$. The values of the bits $X_2$ and $X_1$ are updated based on the value written to those bits $X_2$ and $X_1$ by the processing device. More specifically, the value of "11" was written to the bits $X_2$ and $X_1$.

Figure 6:
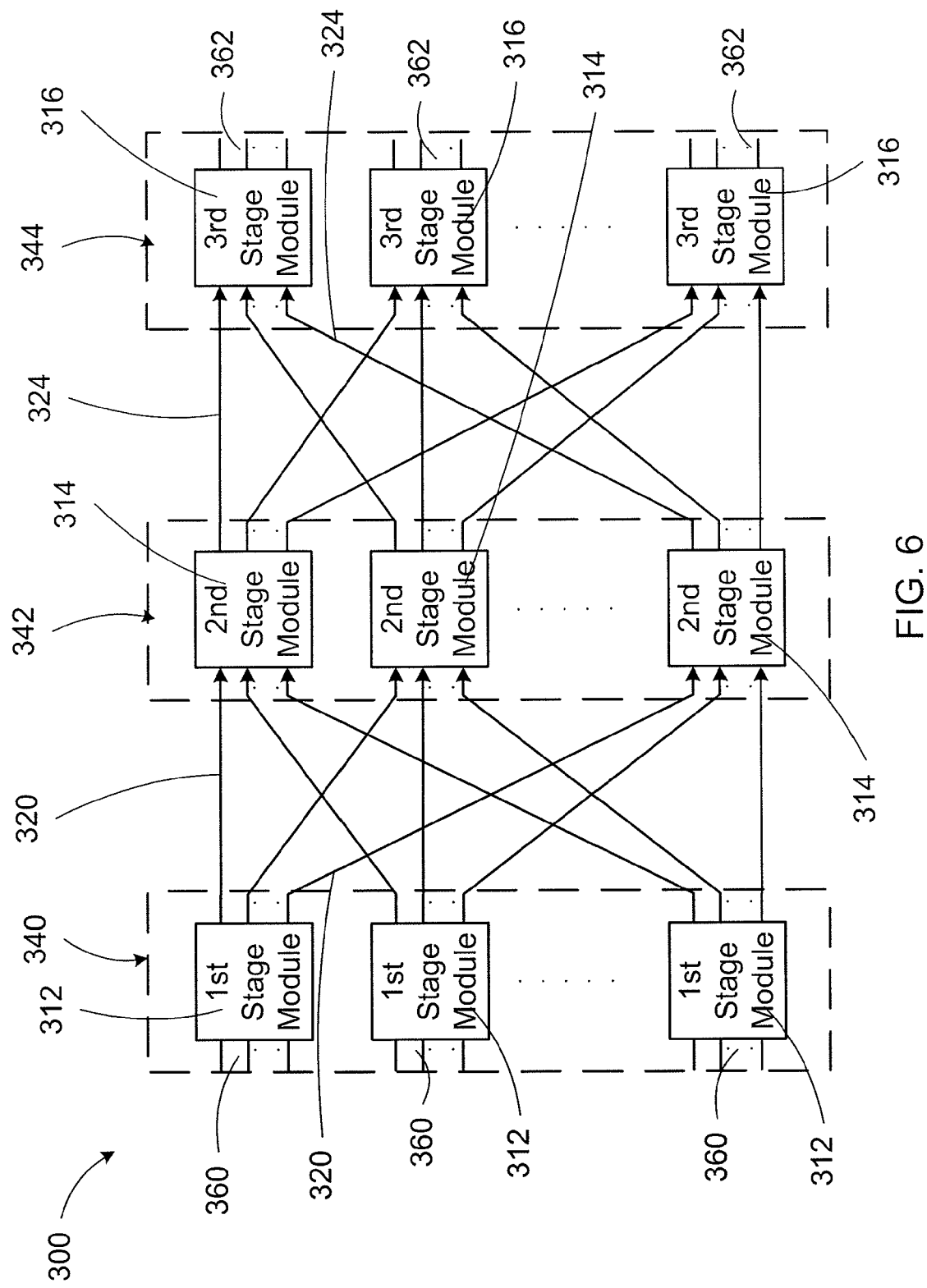
FIG. 6 is a schematic illustration of a switch fabric, according to another embodiment.

As discussed above, such a register (e.g., register 100 or 200) can be used in any suitable system. FIG. 6, for example, is a schematic illustration of a switch fabric 300 in which the registers described above (e.g., register 100 or 200) can be used, according to another embodiment. Switch fabric 300 is a three-stage, non-blocking Clos network and includes a first stage 340, a second stage 342, and a third stage 344. The first stage 340 includes modules 312. Each module 312 of the first stage 340 is an assembly of electronic components and circuitry. In some embodiments, for example, each module is an application-specific integrated circuit (ASIC). In other embodiments, multiple modules are contained on a single ASIC or a single chip package. In still other embodiments, each module is an assembly of discrete electrical components. As described in further detail herein, such modules can include a register similar to the register 100 shown and described with respect to FIGS. 1 and 2.

In some embodiments, each module 312 of the first stage 340 is a switch (e.g., a packet switch, a frame switch, an integrated Ethernet switch and/or a cell switch). The switches are configured to redirect data (e.g., data packets, data cells, etc.) as it flows through the switch fabric 300. In some embodiments, for example, each switch includes multiple input ports operatively coupled to write interfaces on a memory buffer (not shown in FIG. 3). Similarly, a set of output ports are operatively coupled to read interfaces on the memory buffer. In some embodiments, the memory buffer can be a shared memory buffer implemented using on-chip static random access memory (SRAM) to provide sufficient bandwidth for all input ports to write one incoming cell (e.g., a portion of a data packet) or data packet per time period (e.g., one or more clock cycles) and all output ports to read one outgoing cell or data packet per time period. Each switch operates similar to a crossbar switch that can be reconfigured subsequent each time period.

Each module 312 of the first stage 340 can include one or more registers similar to the register 100 shown and described with respect to FIGS. 1 and 2. Such registers can be used, for example, by various functions and/or processes executed at each module 312 of the first stage 340. For example, the registers can be associated with MAC learning functions, hash lookup functions, routing functions, DMA functions, interrupt functions, and/or the like. Such registers are useful in such a switch fabric 300 because they can reduce the amount of processing time used at each module 312 of the switch fabric 300. For example, a single write instruction can be used to update the register. Thus, a function and/or process does not lock the register for a period of time to update the register. This reduces the amount of time used for a function and/or a process to update the register. Additionally, this allows a second process and/or function (or the same process and/or function) to write to another portion of the register (e.g., a different set of bits) immediately after the write instruction associated with a first process and/or function causes the module 312 to write to the register. Moreover, because the register is not locked, each process and/or function can read the contents of the register at any time. Accordingly, when a module 312 is routing, switching and/or forwarding data packets and/or cells, the processing time associated with the functions on that module 312 can decrease by using registers similar to those described above.

Each module 312 of the first stage 340 includes a set of input ports 360 configured to receive data (e.g., a signal, a cell of a packet, a data packet, etc.) as it enters the switch fabric 300. In this embodiment, each module 312 of the first stage 340 includes the same number of input ports 360.

Similar to the first stage 340, the second stage 342 of the switch fabric 300 includes modules 314. The modules 314 of the second stage 342 are structurally similar to the modules 312 of the first stage 340. As such, each module 314 of the second stage 342 can include one or more registers similar to the register 100 shown and described above with respect to FIGS. 1 and 2. Each module 314 of the second stage 342 is operatively coupled to each module 312 of the first stage 340 by a data path 320. Each data path 320 between a given module 312 of the first stage 340 and a given module 314 of the second stage 342 is configured to facilitate data transfer from the modules 312 of the first stage 340 to the modules 314 of the second stage 342.

The data paths 320 between the modules 312 of the first stage 340 and the modules 314 of the second stage 342 can be constructed in any manner configured to facilitate data transfer from the modules 312 of the first stage 340 to the modules 314 of the second stage 342. In some embodiments, for example, the data paths 320 are optical connectors between the modules. In other embodiments, the data paths are within a midplane. Such a midplane can be similar to that described in U.S. application Ser. No. 12/345,500, filed Dec. 29, 2008, and entitled "System Architecture for a Scalable and Distributed Multi-Stage Switch Fabric," which is incorporated herein by reference in its entirety. Such a midplane can be used to connect each module of the second stage with each module of the first stage. In still other embodiments, two or more modules are contained within a single chip package and the data paths are electrical traces.

In some embodiments, the switch fabric 300 is a non-blocking Clos network. Thus, the number of modules 314 of the second stage 342 of the switch fabric 300 varies based on the number of input ports 360 of each module 312 of the first stage 340. In a rearrangeably non-blocking Clos network (e.g., a Benes network), the number of modules 314 of the second stage 342 is greater than or equal to the number of input ports 360 of each module 312 of the first stage 340. Thus, if n is the number of input ports 360 of each module 312 of the first stage 340 and m is the number of modules 314 of the second stage 342, m≥n. In some embodiments, for example, each module of the first stage has five input ports. Thus, the second stage has at least five modules. All five modules of the first stage are operatively coupled to all five modules of the second stage by data paths. Said another way, each module of the first stage can send data to any module of the second stage.

The third stage 344 of the switch fabric 300 includes modules 316. The modules 316 of the third stage 344 are structurally similar to the modules 312 of the first stage 340. As such, each module 316 of the third stage 344 can include one or more registers similar to the register 100 shown and described above with respect to FIGS. 1 and 2. The number of modules 316 of the third stage 344 is typically equivalent to the number of modules 312 of the first stage 340. Each module 316 of the third stage 344 includes output ports 362 configured to allow data to exit the switch fabric 300. Each module 316 of the third stage 344 includes the same number of output ports 362. Further, the number of output ports 362 of each module 316 of the third stage 344 is typically equivalent to the number of input ports 360 of each module 312 of the first stage 340. Accordingly, in such embodiments, the number of input ports of the switch fabric 300 can be the same as the number of output ports of the switch fabric 300.

Each module 316 of the third stage 344 is connected to each module 314 of the second stage 342 by a data path 324. The data paths 324 between the modules 314 of the second stage 342 and the modules 316 of the third stage 344 are configured to facilitate data transfer from the modules 314 of the second stage 342 to the modules 316 of the third stage 344.

The data paths 324 between the modules 314 of the second stage 342 and the modules 316 of the third stage 344 can be constructed in any manner configured to facilitate data transfer from the modules 314 of the second stage 342 to the modules 316 of the third stage 344. In some embodiments, for example, the data paths 324 are optical connectors between the modules. In other embodiments, the data paths are within a midplane. Such a midplane can be used to connect each module of the second stage with each module of the third stage. In still other embodiments, two or more modules are contained within a single chip package and the data paths are electrical traces.

In use, the switch fabric 300 can facilitate data transfer from a source access switch operatively coupled to an input port 360 of a module 312 of the first stage 340 to a destination access switch (not shown in FIG. 6) operatively coupled to an output port 362 of a module 316 of the third stage 344. The modules 312 of the first stage 340, the modules 314 of the second stage 342, and the modules 316 of the third stage 344 can use registers similar to the register 100 shown and described with respect to FIGS. 1 and 2 to quickly perform routing and/or any other functions and/or processes on the data packets and/or cells as the data packets and/or cells are sent from the source access switch to the destination access switch. Additional details about the switch fabric 300 and the switch fabric system within which the switch fabric 300 can operate are shown and described in U.S. patent application Ser. No. 12/495,337, filed Jun. 30, 2009, and entitled "Methods and Apparatus Related to Any-to-Any Connectivity Within a Data Center," which is incorporated herein by reference in its entirety.

FIG. 7 is a flow chart illustrating a method 400 of writing a value to a register, according to another embodiment. The method 400 includes writing, to a first portion of a register, a first value that indicates a first set of bits from multiple bits of a second portion of the register with which a first function is associated, at 402. The first portion of the register can be a mask and/or a key for the second portion of the register. Accordingly, the first function is configured to write data to and/or store data in the first set of bits from multiple bits of the second portion of the register. This is indicated by the mask and/or key written to the first portion of the register. The first function is configured to not write data to and/or store data in the bits from the multiple bits of the second portion of the register, mutually exclusive from the first set of bits.

A second value having multiple bits, each of which is uniquely-associated with one bit from the multiple bits of the second portion of the register, is written to the second portion of the register, at 404. As a result, a bit value of each bit from the first set of bits from the multiple bits of the second portion of the register is made equal to a bit value of its associated bit from the multiple bits of the second value, in response to writing the second value. A bit value of each bit from the multiple bits of the second portion of the register, mutually exclusive from the first set of bits, is not made equal to a bit value of its associated bit from the multiple bits of the second value in response to writing the second value.

A third value, which indicates a second set of bits from multiple bits of the second portion of the register with which a second function is associated, is written to the first portion of the register, at 406. In some embodiments, the second set of bits can be mutually exclusive of the first set of bits. The second function is configured to not write data to and/or store data in the bits from the multiple bits of the second portion of the register, mutually exclusive from the second set of bits.

A fourth value having multiple bits, each of which is uniquely-associated with one bit from the multiple bits of the second portion of the register, is written to the second portion of the register, at 408. As a result, a bit value of each bit from the second set of bits from the multiple bits of the second portion of the register is made equal to a bit value of its associated bit from the multiple bits of the fourth value, in response to writing the second value, at 408. A bit value of each bit from the multiple bits of the second portion of the register mutually exclusive from the second set of bits, is not made equal to a bit value of its associated bit from the multiple bits of the fourth value in response to writing the fourth value.

While shown and described in FIGS. 1-5 as the higher-order bits of the register (e.g., register 100 and register 200) being the mask portion of the register and the lower-order bits of the register being the data portion of the register, in other embodiments, the higher order bits of a register can be the data portion and the lower-order bits of the register can be the mask portion. In such embodiments, a processing device can write the lower-order bits of the register prior to writing the higher-order bits of the register. More specifically, the lower-order bits of the register can indicate to the processing device whether or not to write to specific higher-order bits. In other embodiments, the mask portion of the register can be interleaved with the data portion of the register. For example, the highest order bit of a four bit register can be a first mask bit $M_2$, the second bit can be a first data bit $X_2$, the third bit can be a second mask bit $M_1$, and the last bit can be a second data bit $X_1$ (e.g., $M_2X_2M_1X_1$). In still other embodiments, the mask bits of the register and the data bits of the register can be interleaved in any order.

While shown and described above as the mask portion of the register having a same number of bits as the data portion of the register, in some embodiments, the data portion of the register includes a greater number of bits than the mask portion of the register. In some embodiments, for example, the data portion of the register can include twice as many bits as the mask portion of the register. In such an example, a single bit of the mask portion of the register can be associated with two bits of the data portion of the register. Both bits of the data portion of the register associated with a bit of the mask portion of the register are written if that bit of the mask portion of the register is set. Accordingly, a single bit of the mask portion determines whether to write to multiple bits of the data portion. In other embodiments, any number of bits of a data portion of a register can be associated with a single bit of a mask portion of a register.

While shown and described above as a module being associated with (e.g., being able to write to) a set of bits in a data portion of a register using a key and/or mask specific to that module, in some embodiments, each process and/or function associated with that module can have its own specific key and/or mask. For example, a first process and/or function at the module can have a key and/or mask that allows the first process to write to one or more bits from the set of bits and a second process and/or function at the module can have a key and/or mask that allows the second process to write to one or more different bits from the set of bits.

While shown and described above as a data bit being written when its associated mask bit has a value of "1," in other embodiments, a data bit is written when its associated mask bit has a value of "0." In such embodiments, a data bit is not written when its associated mask bit has a value of "1."

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

While various embodiments have been described above, it should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. An apparatus, comprising:
   a register including a first portion and a second portion, the first portion of the register having a plurality of bits, the second portion of the register having a plurality of bits, each bit from the plurality of bits for the first portion of the register being associated with a bit from the plurality of bits for the second portion of the register such that a bit from the plurality of bits for the first portion of the register is set for its associated bit from the plurality of bits for the second portion of the register to be written.

2. The apparatus of claim 1, wherein a first bit and a second bit from the plurality of bits for the first portion of the register and a first bit and a second bit from the plurality of bits for the second portion of the register are associated with a first function and a second function, respectively, from a plurality of functions,
   the first bit from the plurality of bits for the first portion of the register is set to a first value when the first function writes to the register,
   the remaining bits from the plurality of bits for the first portion of the register are set to a second value when the first function writes to the register,
   the first bit from the plurality of bits for the second portion of the register is set to a value when the first function writes to the register.

3. The apparatus of claim 1, wherein the first portion of the register is a bit mask for the second portion of the register.

4. The apparatus of claim 1, wherein a first process is configured to write to a first set of bits from the plurality of bits for the second portion of the register, a second process is configured to write to a second set of bits from the plurality of bits for the second portion of the register.

5. The apparatus of claim 1, wherein the register is included within an application specific integrated circuit of a switch module.

6. The apparatus of claim 1, wherein the register is included within a field programmable gate array.

7. The apparatus of claim 1, wherein the bit from the plurality of bits for the first portion of the register is set prior to its associated bit from the plurality of bits for the second portion of the register being written.

8. The apparatus of claim 1, wherein a first set of bits from the plurality of bits for the second portion of the register is associated with a hash function, a second set of bits from the plurality of bits for the second portion of the register is associated with an interrupt function, the first set of bits being mutually exclusive of the second set of bits.

9. A non-transitory processor-readable medium storing code representing instructions to cause a processor to:
   write a first value to a first portion of a register, the first value indicating a first set of bits from a plurality of bits of a second portion of the register with which a function is associated and not a second set of bits from the plurality of bits of the second portion of the register; and
   write a second value having a plurality of bits to the second portion of the register, each bit from the plurality of bits of the second value being uniquely-associated with one bit from the plurality of bits of the second portion of the register, a bit value of each bit from the first set of bits from the plurality of bits of the second portion of the register being made equal to a bit value of its associated bit from the plurality of bits of the second value in response to writing the second value, a bit value of each bit from the second set of bits not changing in response to writing the second value.

10. The non-transitory processor-readable medium of claim 9, wherein a number of bits from a plurality of bits of the first portion of the register is equal to a number of bits from the plurality of bits of the second portion of the register.

11. The non-transitory processor-readable medium of claim 9, wherein the first portion of the register is a bit mask for the second portion of the register.

12. The non-transitory processor-readable medium of claim 9, wherein the function is a first function, the non-transitory processor-readable medium further comprising code representing instructions to cause the processor to:

write a third value to the first portion of the register, the third value indicating a third set of bits from the plurality of bits of the second portion of the register with which a second function is associated and not a fourth set of bits from the plurality of bits of the second portion of the register; and write a fourth value having a plurality of bits to the second portion of the register, each bit from the plurality of bits of the fourth value being uniquely-associated with one bit from the plurality of bits of the second portion of the register, a bit value of each bit from the third set of bits from the plurality of bits of the second portion of the register being made equal to a bit value of its associated bit from the plurality of bits of the fourth value in response to writing the fourth value, a bit value of each bit from the fourth set of bits not changing in response to writing the fourth value.

13. The non-transitory processor-readable medium of claim 9, wherein the first set of bits from the plurality of bits of the second portion of the register is mutually exclusive of the second set of bits from the plurality of bits of the second portion of the register.

14. The non-transitory processor-readable medium of claim 9, wherein the first value sets a first set of bits from a plurality of bits of the first portion of the register to a first bit value, the first set of bits from the plurality of bits of the first portion of the register being associated with the first set of bits from the plurality of bits of the second portion of the register, the first value sets a second set of bits from the plurality of bits of the first portion of the register to a second bit value different from the first bit value, the second set of bits from the plurality of bits of the first portion of the register being associated with the second set of bits from the plurality of bits of the second portion of the register.

15. An apparatus, comprising:

a register having a first portion and a second portion mutually exclusive of the first portion, the first portion of the register having a plurality of bits and the second portion of the register having a plurality of bits, each bit from the plurality of bits for the second portion of the register is uniquely-associated with one bit from the plurality of bits for the first portion of the register; and a processor configured to execute a module that writes a first set of bits to the first portion of the register such that the each bit from the plurality of bits for the first portion of the register equals a value of an associated bit from the first set of bits, the processor configured to execute the module such that a value of each bit from the plurality of bits for the second portion of the register is made equal to a value of an associated bit of a second set of bits when (1) the uniquely-associated bit from the plurality of bits for the first portion of the register has a first value, and (2) the module writes the second set of bits to the second portion of the register, the processor configured to execute the module such that a value of each bit from the plurality of bits for the second portion of the register is not changed when (1) the uniquely-associated bit from the plurality of bits for the first portion of the register has a second value, and (2) the module writes the second set of bits to the second portion of the register.

16. The apparatus of claim 15, wherein the register is part of an application specific integrated circuit.

17. The apparatus of claim 15, wherein the register is part of a field programmable gate array.

18. The apparatus of claim 15, wherein the first set of bits is a key of a module associated with bits from the plurality of bits for the second portion of the register.

19. The apparatus of claim 15, wherein the module is a first module, the processor configured to execute a second module that writes a third set of bits to the first portion of the register such that each bit from the plurality of bits for the first portion of the register equals a value of an associated bit from the third set of bits, a value of at least one bit from the first set of bits being different than a value of at least one bit from the third set of bits.

20. The apparatus of claim 15, wherein a number of bits from the plurality of bits for the first portion of the register is equal to a number of bits from the plurality of bits for the second portion of the register.

* * * * *